(12) United States Patent
Obana et al.

(10) Patent No.: US 12,194,619 B2
(45) Date of Patent: Jan. 14, 2025

(54) FOOT STRUCTURE OF LEGGED MOBILE ROBOT, AND LEGGED MOBILE ROBOT

(71) Applicant: Sony Interactive Entertainment Inc., Tokyo (JP)

(72) Inventors: Koichi Obana, Tokyo (JP); Yuta Koda, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 275 days.

(21) Appl. No.: 17/640,029

(22) PCT Filed: Oct. 19, 2020

(86) PCT No.: PCT/JP2020/039261
§ 371 (c)(1),
(2) Date: Mar. 3, 2022

(87) PCT Pub. No.: WO2021/079847
PCT Pub. Date: Apr. 29, 2021

(65) Prior Publication Data
US 2022/0314467 A1   Oct. 6, 2022

(30) Foreign Application Priority Data

Oct. 25, 2019   (JP) .................................. 2019-194418

(51) Int. Cl.
*B25J 13/08*   (2006.01)
*B25J 15/00*   (2006.01)
(Continued)

(52) U.S. Cl.
CPC ....... *B25J 17/0283* (2013.01); *B25J 15/0019* (2013.01); *B25J 19/02* (2013.01); *B62D 57/032* (2013.01)

(58) Field of Classification Search
CPC ...... B25J 19/02; B25J 15/0019; B25J 13/085; B62D 57/032
See application file for complete search history.

(56) References Cited

U.S. PATENT DOCUMENTS

2004/0181312 A1* 9/2004 Miura .................... B25J 13/085
                                                              700/258
2005/0067993 A1* 3/2005 Kato ...................... B62D 57/02
                                                              318/568.12

FOREIGN PATENT DOCUMENTS

JP           60257335 A    12/1985
JP           11333765 A    12/1999
(Continued)

OTHER PUBLICATIONS

International Search Report for corresponding PCT Application No. PCT/JP2020/039261, 4 pages, dated Nov. 24, 2020.

*Primary Examiner* — Cortez M Cook
(74) *Attorney, Agent, or Firm* — Kilpatrick Townsend & Stockton LLP

(57) ABSTRACT

A floor reaction force to a foot of a legged mobile robot is detected with a suitable degree of accuracy, by use of a strain sensor having comparatively low sensitivity. The foot includes an upper frame connected to a movable leg, a lower frame which is disposed under the upper frame and contacts with a walking surface, a strain generating member which is connected to the upper frame and the lower frame at different positions from each other in top plan view and undergoes bending deformation according to a change in distance or inclination between the instep member and the sole member, and a plurality of strain sensors disposed at positions different from each other on the strain generating member.

9 Claims, 5 Drawing Sheets

(51) Int. Cl.
  *B25J 17/02* (2006.01)
  *B25J 19/02* (2006.01)
  *B62D 57/032* (2006.01)

(56) References Cited

FOREIGN PATENT DOCUMENTS

| | | | |
|---|---|---|---|
| JP | 2000254888 A | | 9/2000 |
| JP | 2003266362 A | * | 9/2003 |
| JP | 2004167663 A | | 6/2004 |

\* cited by examiner

FOOT STRUCTURE OF LEGGED MOBILE ROBOT, AND LEGGED MOBILE ROBOT

TECHNICAL FIELD

The present invention relates to a legged mobile robot that includes movable legs, and particularly to a structure of a foot provided at a lower end of a movable leg and configured to be in contact with a walking surface.

BACKGROUND ART

In a legged mobile robot that includes movable legs and walks and moves, a sensor for detecting a floor reaction force is provided on its foot in order to control a posture of the robot and grasp a state of the walking surface.

Especially, in a robot that performs bipedal walking, the sensor is significant for posture control and stable walking. For example, at present, many bipedal walking robots adopt the zero moment point (ZMP) criterion for posture control and stable walking. In a case where motion control of a robot is performed using the ZMP as a stability discrimination criterion, it is very effective to measure an actual ZMP. Therefore, it is a practice to provide a strain sensor, a force sensor, or the like on a foot and calculate a ZMP using an output of the sensors.

Conventionally, a load cell in which a strain sensor is installed on a strain generating member having a pillar shape is disposed on a foot to detect a floor reaction force. Further, in PTL 1 specified below, as a prior art of a foot sensor, a load cell configured from a strain generating member and a strain gauge disposed on the ankle is described.

CITATION LIST

Patent Literature

[PTL 1] JP 2000-254888A

SUMMARY

Technical Problems

Such a portion to which the load of a robot is directly applied as an angle can be structured so as to be less likely to be deformed. In a configuration in which a strain sensor is disposed at the portion, the strain becomes small, thereby making it difficult to detect a small difference in stress and, as a result, to secure an accuracy of a floor reaction force calculated on the basis of the output of the strain sensor.

The present invention has been made to solve the problems described above, and it is an object of the present invention to provide a foot structure and a legged mobile robot that can detect a floor reaction force with a suitable degree of accuracy while a strain sensor having a comparatively low sensitivity is used.

Solution to Problems (1) A foot structure according to the present invention is a structure of a foot provided at a lower end of a movable leg of a legged mobile robot, the foot structure including an instep member connected to the movable leg, a sole member which is disposed under the instep member and contacts with a walking surface, a strain generating member which is connected to the instep member and the sole member at different positions from each other in top plan view and undergoes bending deformation according to a change in distance or inclination between the instep member and the sole member; and a plurality of strain sensors disposed at positions different from each other on the strain generating member.

(2) The foot structure according to (1) above can be configured such that the strain generating member is disposed at each of a plurality of positions on the foot in top plan view.

(3) The foot structure according to (1) or (2) above can be configured such that the strain generating member extends in a horizontal direction.

(4) The foot structure according to (3) above can be configured such that the strain generating member extends one-dimensionally, has a first position and a second position as connection positions to one of the instep member and the sole member, and has, between the first position and the second position, a third position as a connection position to the other of the instep member and the sole member, and the strain sensors are individually installed between the first position and the third position and between the second position and the third position.

(5) The foot structure according to (4) above can be configured such that the first position and the second position are symmetrical positions with respect to the third position, and the strain sensors installed on opposite sides of the third position are installed at positions symmetrical with respect to the third position.

(6) The foot structure according to (4) or (5) above can be configured such that the strain generating members are disposed on two sides, which are opposed to each other, of a rectangular shape that includes sides extending along a forward and rearward direction of the foot and sides extending in a leftward and rightward direction of the foot.

(7) The foot structure according to (6) above can be configured such that the strain generating members are disposed along long sides of the rectangular shape.

(8) The foot structure according to any one of (4) to (7) above can be configured such that the strain generating member is a leaf spring that elastically supports the instep member against a load of the legged mobile robot.

(9) The foot structure according to (8) above can be configured such that it further includes a strain generating member supporting base which is provided on the sole member and supports thereon opposite ends of the strain generating member such that a middle portion of the strain generating member is spaced away upwardly from the sole member, and a strain generating member pressing portion which is a projection provided on a lower face of the instep member so as to be opposed to the middle portion of the strain generating member and is connected to the strain generating member, in which the strain generating member has rigidity that is set low under a condition that, when a maximum load supposed in advance is applied from the strain generating member pressing portion to the strain generating member, the middle portion of the strain generating member does not contact with the sole member.

(10) The foot structure robot according to any one of (1) to (5) above can be configured such that the foot has a substantially rectangular shape in top plan view and has angular portions that form four corners, long sides extending along a forward and rearward direction, and short sides extending along a leftward and rightward direction, the sole member has a strain generating member supporting base at each of the angular portions, the strain generating members are each a leaf spring elongated in the forward and rearward direction and each extend between a pair of the strain generating member supporting bases on a left side on the sole member and between a pair of the strain generating member supporting bases on a right side on the sole member, and the instep member has a strain generating member pressing portion which is a projection provided at each of opposite left and right end portions of a lower face of the instep member and which is connected to the middle portion of the strain generating member.

(11) The legged mobile robot according to the present invention includes the foot structure according to any one of (1) to (10) above.

Advantageous Effect of Invention

According to the present invention, a foot structure and a legged mobile robot are obtained which can detect a floor reaction force with a suitable degree of accuracy while a strain sensor having a comparatively low sensitivity is used.

DESCRIPTION OF EMBODIMENT

In the following, a mode for carrying out the present invention (hereinafter referred to as an embodiment) is described with reference to the drawings.

Figure 1:
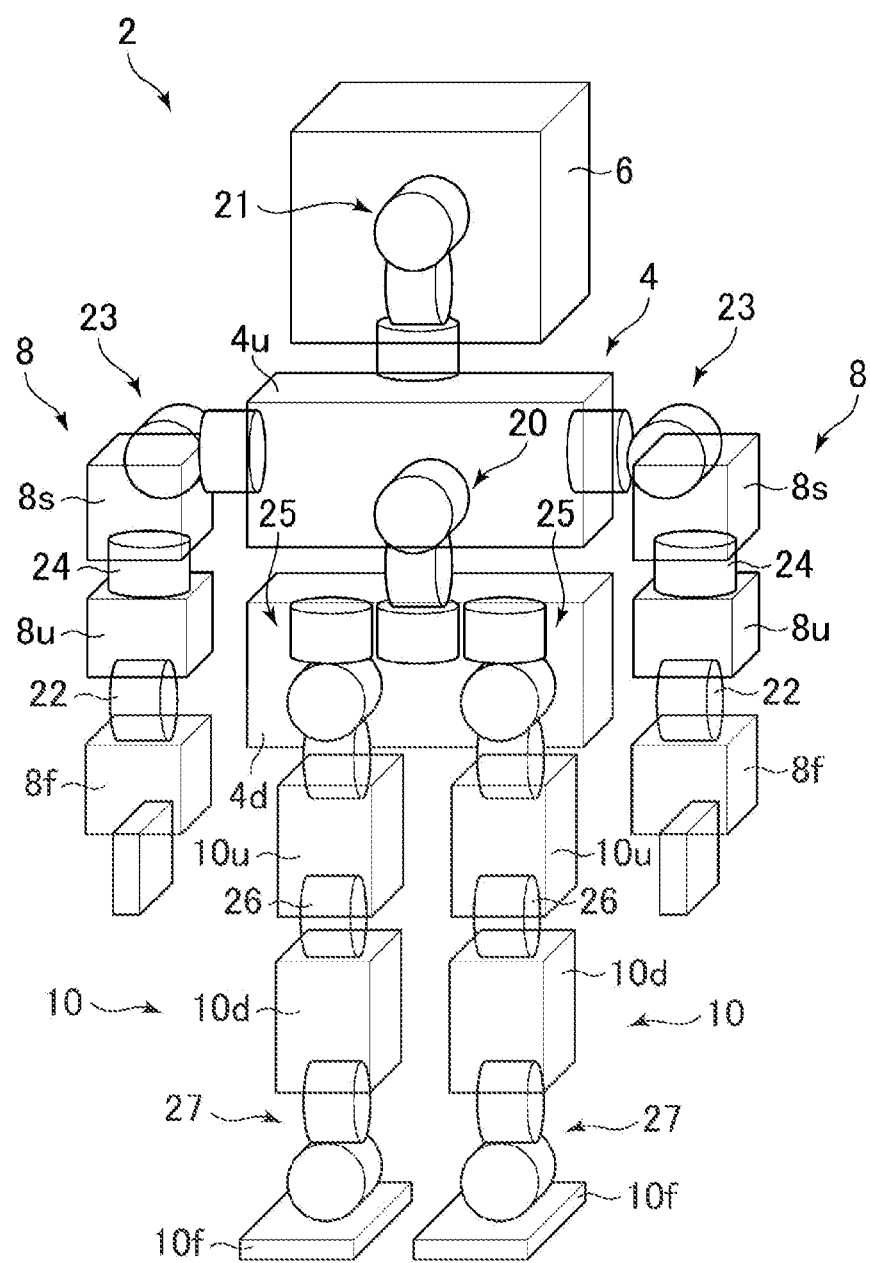
FIG. 1 is a schematic perspective view of a humanoid robot that is an embodiment of the present invention.

FIG. 1 is a schematic view of a humanoid robot 2 that is an embodiment of the legged mobile robot according to the present invention and depicts a perspective view of the humanoid robot 2 in a standing state. The humanoid robot 2 includes movable parts that enables movements similar to those of a human in addition to the legs. In particular, the humanoid robot 2 includes a body 4, a head 6, and a pair of left and right upper limbs 8 and a pair of left and right lower limbs 10.

The body 4 is composed of a chest 4u and an abdomen 4d, and a relative angle between them can be changed around three axes for rolling, pitching, and yawing by an actuator group 20.

The head 6 is connected over the chest 4u, and an angle thereof can be changed around three axes for rolling, pitching, and yawing by an actuator group 21 provided at a connection portion corresponding to a neck joint.

Each of the left and right upper limbs 8 includes a first upper limb portion 8s, a second upper limb portion 8u, and a third upper limb portion 8f which are connected in order from a side edge of the chest 4u, and an actuator disposed at each connection portion thereof. The second upper limb portion 8u corresponds to the upper arm; the third upper limb portion 8f corresponds to the fore-arm and the hand; and a connection portion between the second upper limb portion 8u and the third upper limb portion 8f corresponds to the elbow joint. Bending of the elbow is performed by an actuator 22 provided at the connection portion therebetween.

The first upper limb portion 8s corresponds to the shoulder, and an actuator group 23 disposed at a connection portion between the first upper limb portion 8s and the chest 4u can change the roll angle and the pitch angle of the first upper limb portion 8s. Meanwhile, an actuator 24 disposed at a connection portion between the first upper limb portion 8s and the second upper limb portion 8u implements a movement equivalent to a twist of the arm.

Each of the left and right lower limbs 10 includes a thigh 10u, a lower thigh 10d, and a foot 10f. The lower limb 10 that is a movable leg is connected at the thigh 10u thereof under the abdomen 4d, and an angle of the lower limb 10 can be changed around the three axes for rolling, pitching, and yawing by an actuator group 25 provided at a connection portion corresponding to a hip joint. The lower thigh 10d is connected under the thigh 10u. A connection portion between the thigh 10u and the lower thigh 10d corresponds to a knee joint, and bending of a knee is performed by an actuator 26 provided at the connection portion.

The foot 10f is connected under the lower thigh 10d and is positioned at a lower end of the movable leg. A connection portion between the foot 10f and the lower thigh 10d corresponds to the foot (ankle) joint, and the roll angle and the pitch angle of the foot 10f are changed by an actuator group 27 provided at the connection portion.

Figure 2:
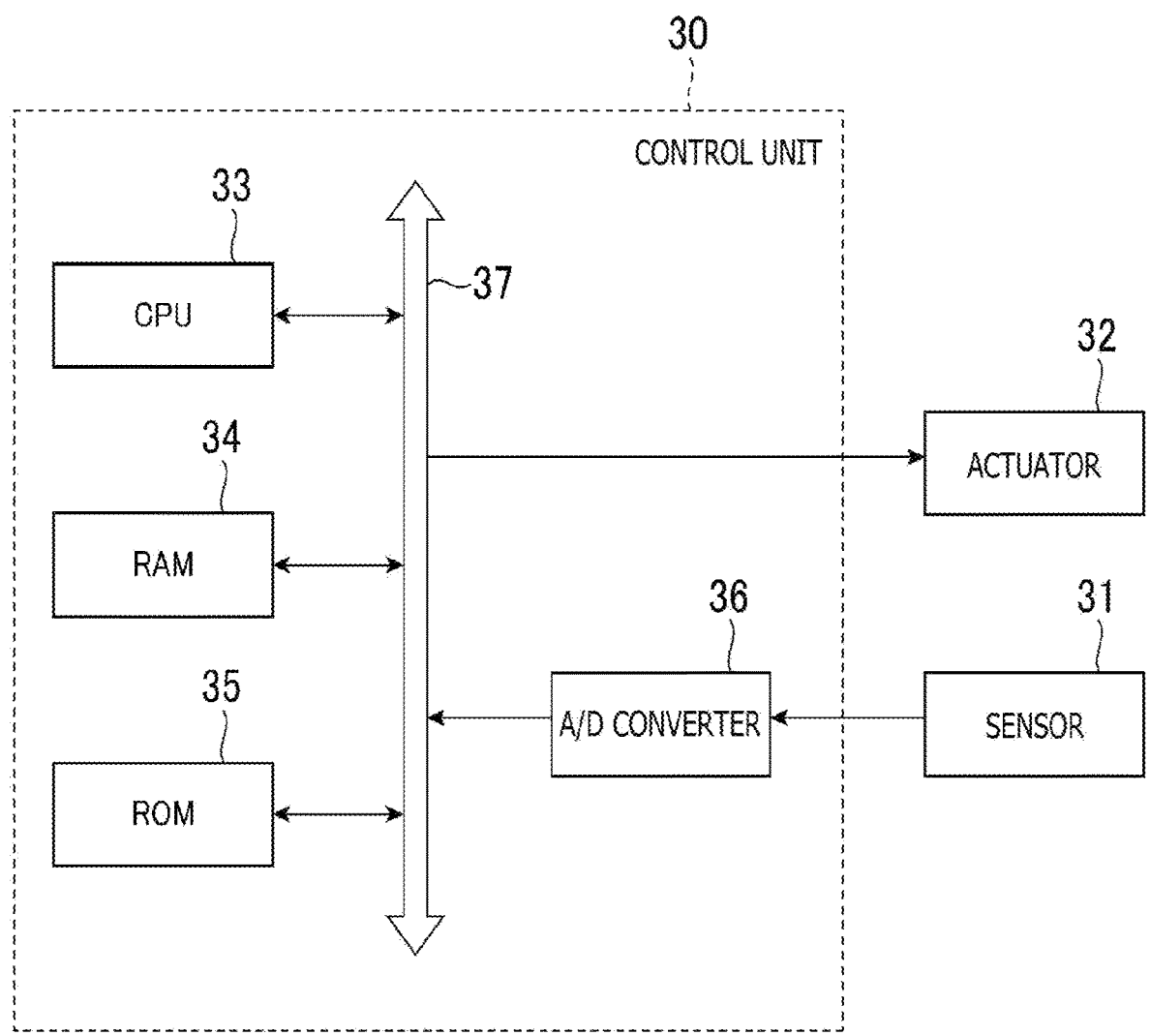
FIG. 2 is a schematic view depicting a general configuration of a control system for the humanoid robot that is the embodiment of the present invention.

FIG. 2 is a schematic view depicting a general configuration of a control system for the humanoid robot 2. A control unit 30 includes a processor and a storage device. The processor executes a program stored in the storage device and performs, for example, a process for a signal inputted from sensors 31 mounted on the humanoid robot 2 and generates a control signal for actuators 32.

It is to be noted that, on the humanoid robot 2, the actuators 20 to 27 are disposed as the actuators 32 at the individual joints. Further, the humanoid robot 2 may have various kinds of sensors 31. For example, in a case where the actuator 32 is configured from a servomotor, also outputs of detectors for the angle, speed, and so forth provided in the servomotor are inputted as signals of the sensors 31 to the control unit 30. Further, especially on the foot 10f, a strain sensor for detecting stress generated in a strain generating member in response to the floor reaction force is provided as a sensor relating to the present invention. The control unit 30 detects a state of the humanoid robot 2 and motions of the components on the basis of the outputs of the sensors 31 and controls the various motions including walking. Especially, in control of the walking motion, detection of the center of gravity of the humanoid robot 2 is required, and to this end, detection of the floor reaction force by the sensors provided on the feet 10f is significant.

The control unit 30 includes, for example, a CPU (Central Processing Unit) 33 as a processor and further includes a RAM (Random Access Memory) 34 and a ROM (Read Only Memory) 35 as storage devices. The control unit 30 may further include an A/D (Analog-to-Digital) converter 36 that converts an analog signal outputted from each of the sensors 31 into a digital signal. The components of the control unit 30 such as the CPU 33, the RAM 34, the ROM 35, and the A/D converter 36 are connected to each other, for example, through a bus 37, and also the actuators 32 may be configured so as to be connected to the bus 37.

The control unit 30 is configured using, for example, a microcomputer or the like and is incorporated in the humanoid robot 2. Alternatively, the control unit 30 can be configured as a separate member from the humanoid robot 2 and connected to the humanoid robot 2 by a cable or the like.

Figure 3:
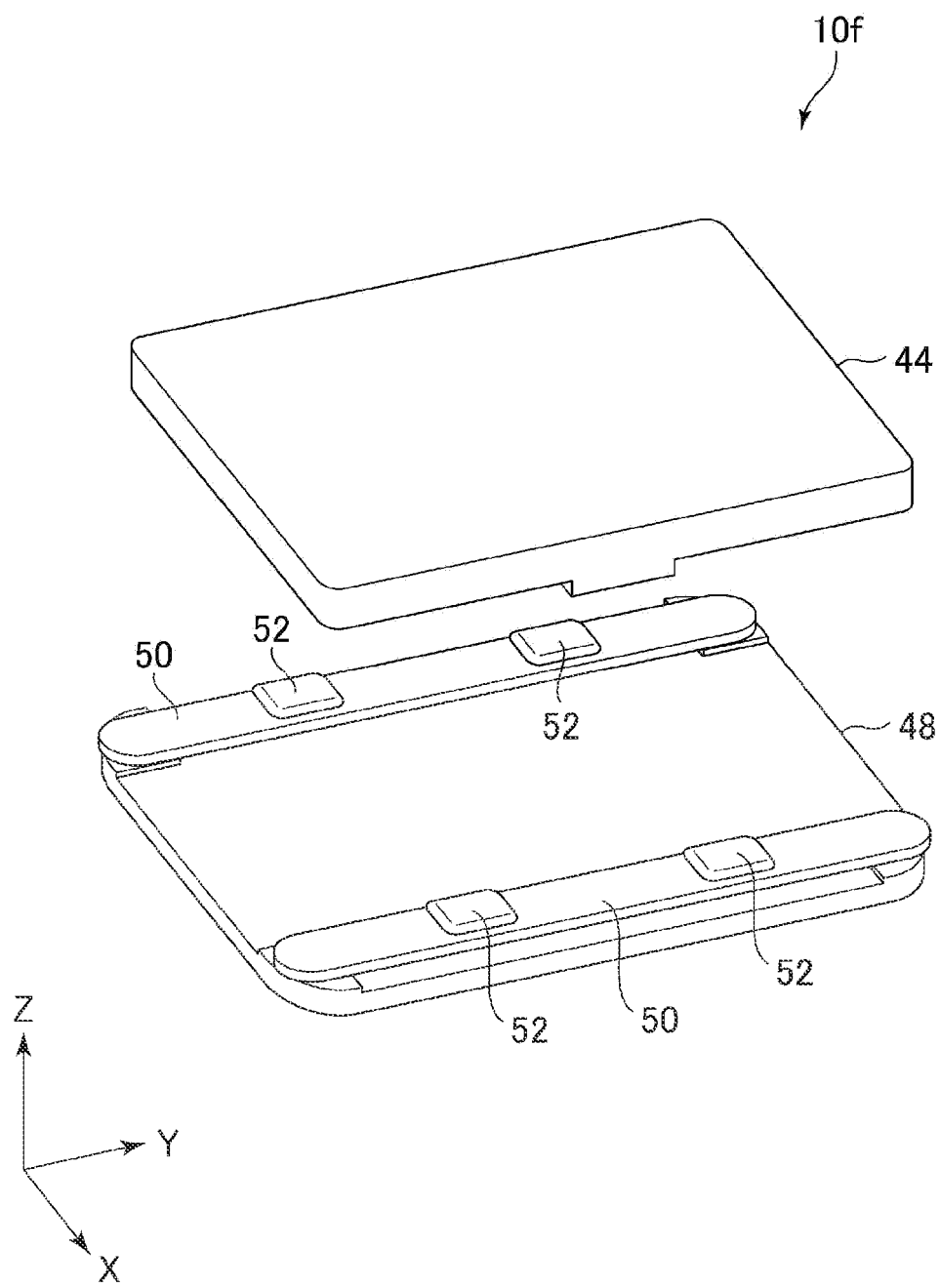
FIG. 3 is a schematic exploded perspective view of a foot of the humanoid robot that is the embodiment of the present invention.

FIG. 3 is a schematic exploded perspective view of the foot 10f. In the following description, it is assumed that the XYZ coordinate system is a rectangular coordinate system for the right hand system, and the Z axis is a vertical axis; the X axis is a horizontal axis in the leftward and rightward direction; and the Y axis is a horizontal axis in the forward and rearward direction. Further, the positive direction of the Z axis is the upward direction; the positive direction of the X axis is the direction from the right to the left of the humanoid robot 2; and the positive direction of the Y axis is the direction from the front to the rear. It is to be noted that, in the present embodiment, the general shape of the foot 10f is a plate shape whose thicknesswise direction is the Z direction, and the planar shape of the foot 10f is a rectangular having short sides extending along the X direction and long sides extending along the Y direction.

Each of the left and right feet 10f has an instep member that is connected to the lower thigh 10d and receives the load of the humanoid robot 2, and a sole member that is disposed under the instep member and contacts with the walking surface. The instep member and the sole member are not limited to those configured from a single material but may be configured individually from a plurality of parts or materials.

FIG. 3 depicts the foot 10f in a form in which it is disintegrated into an upper side part including the instep member and a lower side part including the sole member. The upper side part includes an upper frame 44 having a planar shape of a substantially rectangular shape corresponding to the foot 10f. The upper frame 44 basically corresponds to the instep member. The upper frame 44 is formed from a material and a structure having high rigidity.

On the other hand, the lower side part includes a lower frame 48 having a planar shape of a substantially rectangular shape corresponding to the foot 10f and strain generating members 50 and strain sensors 52 disposed on an upper face of the lower frame 48. The lower frame 48 of the lower side part basically corresponds to the sole member. The lower frame 48 is formed from a material and a structure having high rigidity. Incidentally, as described hereinabove, the planar shape of the upper frame 44 and the lower frame 48 is a substantially rectangular shape corresponding to the foot 10f, and the shapes and the sizes of them may be made substantially same as each other. The strain generating members 50 can be disposed at a plurality of positions in top plan view.

Figure 4:
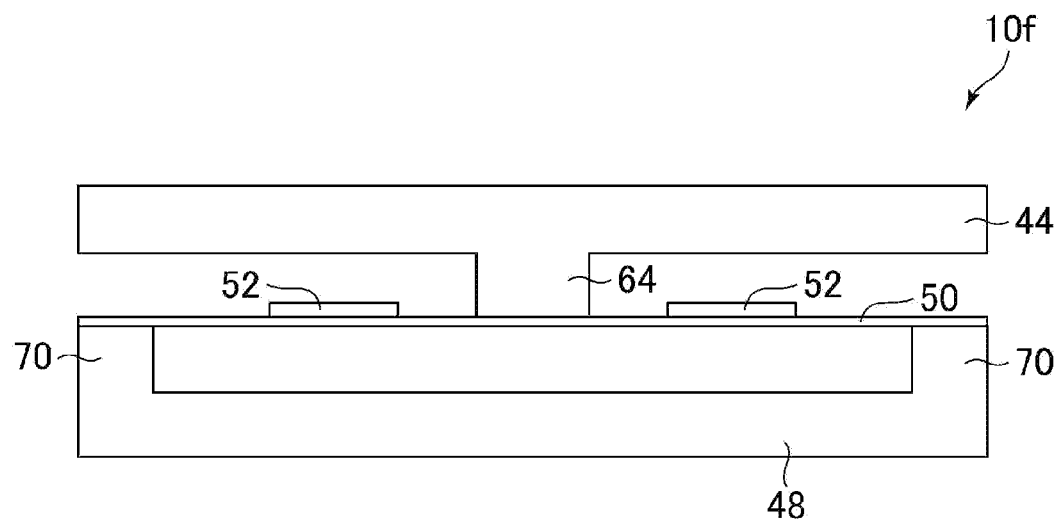
FIG. 4 is a schematic side elevational view of the foot according to the embodiment of the present invention.

The structure of the foot 10f is described in more detail. FIG. 4 is a schematic side elevational view of the foot 10f as viewed in the negative direction of the X axis (namely, as viewed from this side in FIG. 3).

A projection as a strain generating member pressing portion 64 is provided on an edge of the two long sides extending along the Y-axis direction of a lower face of the upper frame 44. For example, the strain generating member pressing portion 64 is disposed at a middle portion of the long sides.

The strain generating members 50 are attached to the lower frame 48 that is the sole member and have a function of causing bending deformation according to a change in distance or mutual inclination between the upper frame 44 and the lower frame 48 to generate strain according to floor reaction force. In particular, each of the strain generating members 50 is configured from an elastic body of high rigidity elongated in the Y axis direction, and the strain generating members 50 are disposed so as to be opposed to the strain generating member pressing portions 64 of the upper frame 44 on the two long sides extending along the Y-axis direction of the lower frame 48. A projection serving as a support base (strain generating member supporting base 70) for the strain generating member 50 is provided at each of angular portions that form four corners of an upper face of the lower frame 48, and the two strain generating member supporting bases 70 lined up on one long side of the lower frame 48 support the opposite ends of the strain generating member 50 disposed on the long side as depicted in FIG. 4. Consequently, the strain generating member 50 is supported such that a middle portion thereof in the Y axis direction is spaced away upwardly from the lower frame 48. On the other hand, to the middle portion of the strain generating member 50, the strain generating member pressing portion 64 of the upper frame 44 is connected. In short, each of the strain generating members 50 extends in the horizontal direction and is connected at different positions from each other to the upper frame 44 and the lower frame 48 such that the upper frame 44 and the lower frame 48 apply respective forces to the strain generating members 50. Especially, the strain generating member pressing portion 64 presses the strain generating member 50 from above with a force according to the load received from the lower thigh 10d, and the strain generating member supporting bases 70 support the strain generating member 50 from below with a force according to the floor reaction force. Thus, the strain generating member 50 is acted upon and deformed by forces in the opposite directions at the opposite end portions and the middle portion thereof.

The strain sensors 52 are installed at a plurality of positions different from each other on the strain generating member 50. In particular, each of the strain generating members 50 extends one-dimensionally in the Y-axis direction (forward and rearward direction), and has connection positions to the lower frame 48 at a front end portion and a rear end portion thereof and has a connection position to the upper frame 44 at a middle portion thereof. The strain sensors 52 are disposed individually between the connection position to the lower frame 48 of the strain generating member supporting base 70 at a front end portion of the strain generating member 50 and the connection position to the upper frame 44 of the strain generating member pressing portion 64 at the middle portion and between the connection position to the lower frame 48 of the strain generating member supporting base 70 at a rear end portion of the strain generating member 50 and the connection position to the upper frame 44 of the strain generating member pressing portion 64 at the middle portion. In the present embodiment, this structure of the strain generating member 50 is configured such that the opposite front and rear sides thereof are symmetrical with respect to the strain generating member pressing portion 64. For example, the distances from the strain generating member pressing portion 64 to the strain generating member supporting base 70 on the front side and the strain generating member supporting base 70 on the rear side are same as each other, and the distances from the strain generating member pressing portion 64 to the strain sensor 52 on the front side and the strain sensor 52 on the rear side are same as each other.

As has been described above, the strain generating members 50 are individually disposed on the two long sides extending along the Y-axis direction of the lower frame 48, and two strain sensors 52 are installed on each of the strain generating members 50. In short, the strain sensors 52 are disposed at totaling four positions including rather forward positions and rather rear positions of the left side strain generating member 50 and the right side strain generating member 50 as viewed from the middle of the foot 10*f* on an XY plane.

The strain generating members 50 also have a function as an elastic supporting member that elastically supports the upper frame 44, which is the instep member, against the load of the humanoid robot 2. In particular, each of the strain generating members 50 configures a leaf spring. The strain generating member 50 is deflected downwardly if the strain generating member pressing portion 64 is pressed against the strain generating member 50 in response to the load acting upon the upper frame 44 thereby to exert upward elastic force to the strain generating member pressing portion 64.

The load received by the upper frame 44 changes according to the posture or the motion state of the humanoid robot 2, and the strain generating members 50 elastically support the upper frame 44 as described hereinabove against the load that is within a supposed range of the change. The rigidity of the strain generating members 50 can be set low within such a limit that the condition that, for example, even if preliminarily supposed maximum load is applied to any of the strain generating members 50, it does not interfere with the lower frame 48 at the position of the strain generating member pressing portion 64 is satisfied. In particular, although a condition or a limit can be set, the strain generating member 50 can be configured so as to be easily deformable, and the strain caused by the floor reaction force or the load becomes great. Therefore, even if the strain sensors 52 have comparatively low sensitivity, they can detect stress by the floor reaction force or load with a high degree of accuracy.

Here, the rigidity becomes higher when a material having a higher elastic modulus such as a Young's modulus or a modulus of rigidity is used. Further, when the material is same, the rigidity becomes higher if the thickness is increased or a cross section having a higher cross-sectional performance such as an H-shaped cross section or a tubular cross section is used. Also in regard to the rigidity, several types are available corresponding to types of deformation such as bending deformation, axial deformation, shear deformation, and torsional deformation. In the present embodiment, the strain generating members 50 are leaf springs, and basically the rigidity of them can be defined by bending rigidity. In particular, the bending rigidity k is given, using a Young's modulus E, a moment I of inertia of area, and a distance L between the point of action and the supporting point of force, by $k=EI/L$. For example, the Young's modulus of each of pure ion, stainless steel, and brass becomes lower in this order. For example, by selection of a material or design of the cross sectional shape from the point of view of the Young's modulus E, the strain generating members 50 can be formed so as to have rigidity that satisfies the condition described hereinabove. For example, the strain generating members 50 can be set to minimum rigidity that satisfies the condition described above for the supposed maximum load.

Figure 5:
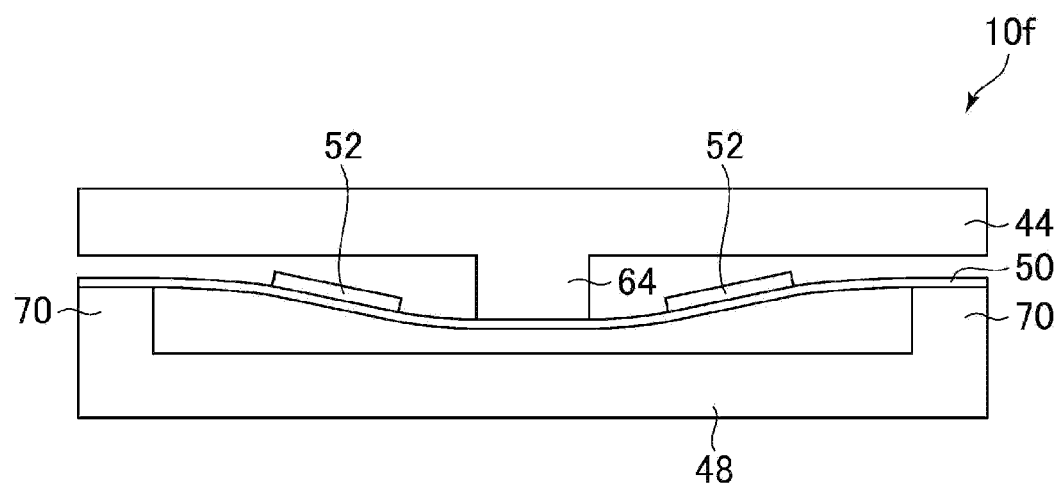
FIG. 5 is a schematic side elevational view of the foot in a state in which an upper frame is displaced downwardly in the embodiment of the present invention.
Figure 6:
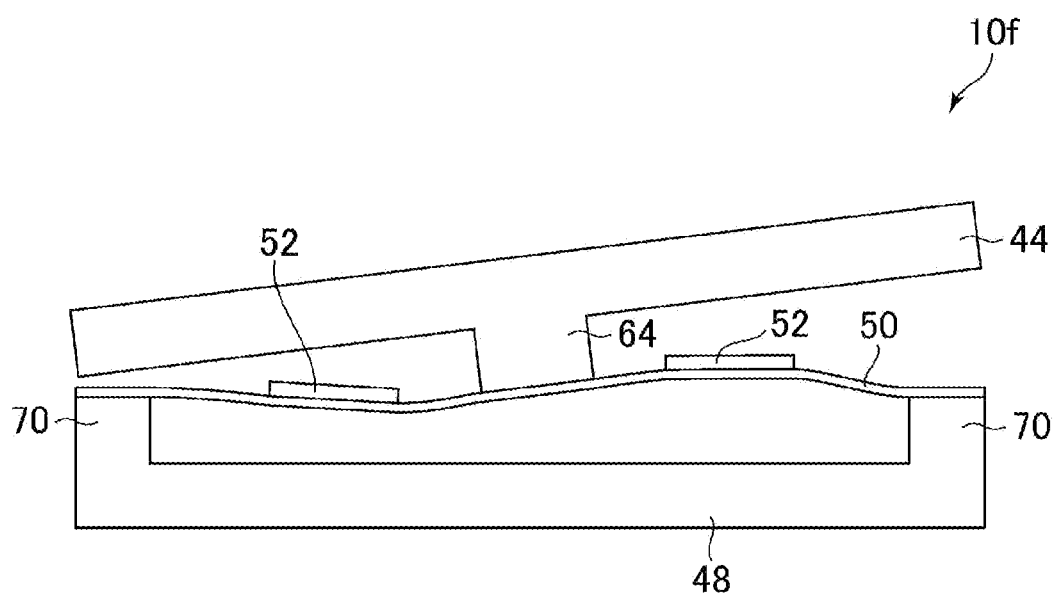
FIG. 6 is a schematic side elevational view of the foot in a state in which the upper frame is inclined forwardly in the embodiment of the present invention.

FIGS. 5 and 6 depict examples of a case in which the lower frame 48 receives floor reaction force and are schematic side elevational views similar to FIG. 4. FIG. 5 depicts a case in which the upper frame 44 is displaced downwardly while keeping a parallel state to the lower frame 48. If the upper frame 44 receives load from the lower thigh 10*d*, then it is displaced downwardly, and the strain generating member 50 is pushed down and deformed at a middle portion thereof by the strain generating member 50. Here, if it is assumed that, for example, the strain generating member 50 and the strain sensors 52 are formed symmetrically in the forward and rearward direction with respect to the strain generating member pressing portion 64, then in a case where the upper frame 44 is displaced in a vertical direction while keeping a horizontal state as depicted in FIG. 5, also the deformation of the strain generating member 50 is basically symmetrical at the front and the rear of it, and also the stresses received by the front and rear strain sensors 52 are same as each other. For example, if it is assumed that the strain sensor 52 on the front side (left side in FIG. 5) with respect to the strain generating member pressing portion 64 receives compressive stress, then also the strain sensor 52 on the rear side (right side in FIG. 5) receives compressive stress similarly. Basically, the stress increases or decreases together with the vertical displacement amount of the upper frame 44, and the vertical displacement amount can be obtained from the magnitude of strain detected by the front and rear strain sensors 52.

FIG. 6 depicts a case in which the upper frame 44 is inclined to the front side. Here, it is assumed that the distance between the upper frame 44 and the lower frame 48 does not vary at the center in the Y direction, namely, the upper frame 44 is not displaced on the whole in the vertical direction. In this case, a forward end portion of the strain generating member pressing portion 64 presses down the strain generating member 50 while a rearward end portion pulls up the strain generating member 50. As a result, the deformation of the strain generating member 50 between the front and the rear becomes basically asymmetrical, and also the stress received by the strain sensor 52 becomes asymmetrical. For example, the strain sensor 52 on the front side (left side in FIG. 5) with respect to the strain generating member pressing portion 64 receives compressive stress while the strain sensor 52 on the rear (right side in FIG. 5) receives tensile stress. Basically, the absolute value of the stress increases or decreases together with an inclination amount of the upper frame 44, and the inclination amount of the upper frame 44 in the forward and rearward direction (around the X axis) can be obtained from the difference between strains detected by the front and rear strain sensors 52.

On the other hand, if the two long sides extending along the Y axis direction of the lower frame 48 are represented as left side long side and right side long side, then the inclination amount in the leftward and rightward direction (around the Y axis) of the upper frame 44 can be obtained from the difference between the strain detected by the strain sensor 52 on the left side long side and the strain detected by the strain sensor 52 on the right side long side. For example, in a case where the upper frame 44 is inclined such that the left side lowers and the right side rises without being displaced in the vertical direction on the whole, on the left side long side, the strain generating member pressing portion 64 pushes down the strain generating member 50, and the strain sensor 52 on the long side detects a downward vertical displacement of the upper frame 44. Meanwhile, on the right side long side, the strain generating member pressing portion 64 pulls up the strain generating member 50, and the strain sensor 52 on the long side detects an upward vertical displacement of the upper frame 44. In short, in regard to the inclination in the leftward and rightward direction of the upper frame 44, basically the deformation of the strain generating members 50 on the long sides on the opposite left and right sides becomes asymmetrical, and also the stress received by the strain sensor 52 becomes asymmetrical between the two long sides. Basically, the difference between the stresses increases or decreases together with the inclination amount of the upper frame 44, and the inclination amount in the leftward and rightward direction of the upper frame 44 can be obtained from the difference between the strains detected by the left and right strain sensors 52 as described hereinabove.

As described hereinabove, the strain sensors 52 disposed at the four locations of the foot 10f form part of the various sensors 31, and output signals are inputted to the control unit 30 therefrom. For example, the control unit 30 uses the output signals of the strain sensors 52 to calculate the floor reaction force at each of the right and left feet and the center of gravity of the humanoid robot 2, and further controls the walking movement using results of the calculation. In particular, the control unit 30 calculates, on the basis of measurement values of the stress obtained by the strain sensors 52 at a plurality of positions in the XY plane of one foot 10f, a floor reaction force vector acting on the foot 10f (composite vector of the floor reaction force over the overall sole) and the point of action of the floor reaction force vector. In the present embodiment, the strain sensors 52 are disposed at four locations such as front, rear, left, and right in the XY plane and can calculate, basically using the outputs of the strain sensors 52, a displacement amount in the vertical direction of the upper frame 44 and inclination amounts in the forward and rearward direction and the leftward and rightward direction of the upper frame 44 as described hereinabove. Furthermore, two-dimensional coordinates in the XY plane of the point of action of the floor reaction force on the foot 10f can be obtained, and the floor reaction force can be obtained as a three-dimensional vector in the XYZ space. It is to be noted that the point of action and the vector of the floor reaction force can be calculated from measurement values of the strain sensors 52 basically at three or more locations in the XY plane. Further, the control unit 30 calculates the ZMP of the humanoid robot 2 on the basis of the outputs of the strain sensors 52.

It is to be noted that, although the strain sensors 52 in the present embodiment are installed on the upper face of the strain generating member 50, they may otherwise be installed on the lower face. Further, although the strain generating members in the present embodiment are disposed on a pair of sides extending along the forward and rearward direction of the foot 10f of a substantially rectangular shape, they may otherwise be disposed on a pair of sides extending along the leftward and rightward direction or may be disposed on all of the four sides. Here, if the case in which the strain generating members 50 are disposed on the long sides of the rectangular shape and the case in which the strain generating members 50 are disposed on the short sides of the rectangular shape are compared with each other, then if the Young's modulus E and the moment I of inertia of area are in common to both cases, then in the former case, the distance L between the point of action and the supporting point of a force becomes greater and the bending rigidity k becomes smaller, and therefore, the strain generating members 50 are easier to be deformed.

The invention claimed is:

1. A foot structure of a legged mobile robot, which is a structure of a foot provided at a lower end of a movable leg of the legged mobile robot, the foot structure comprising:
    an instep member connected to the movable leg;
    a sole member which is disposed under the instep member and contacts with a walking surface;
    a strain generating member which is connected to the instep member and the sole member at different positions from each other in top plan view and undergoes bending deformation according to a change in distance or inclination between the instep member and the sole member; and
    a plurality of strain sensors disposed at positions different from each other on the strain generating member, wherein:
    the strain generating member extends in a horizontal direction,
    the strain generating member extends one-dimensionally, has a first position and a second position as connection positions to one of the instep member and the sole member, and has, between the first position and the second position, a third position as a connection position to the other of the instep member and the sole member,
    the strain sensors are individually installed between the first position and the third position and between the second position and the third position, and
    wherein at least one of:
    (i) the first position and the second position are symmetrical positions with respect to the third position, and the strain sensors installed on opposite sides of the third position are installed at positions symmetrical with respect to the third position, and
    (ii) the strain generating members are disposed on two sides, which are opposed to each other, of a rectangular shape that includes sides extending along a forward and rearward direction of the foot and sides extending in a leftward and rightward direction of the foot.

2. The foot structure of a legged mobile robot according to claim 1, wherein the strain generating member is disposed at each of a plurality of positions on the foot in top plan view.

3. The foot structure of a legged mobile robot according to claim 1, wherein the strain generating members are disposed along long sides of the rectangular shape.

4. The foot structure of a legged mobile robot according to claim 1, wherein the strain generating member is a leaf spring that elastically supports the instep member against a load of the legged mobile robot.

5. The foot structure of a legged mobile robot according to claim 4, further comprising:
    a strain generating member supporting base which is provided on the sole member and supports thereon opposite ends of the strain generating member such that a middle portion of the strain generating member is spaced away upwardly from the sole member; and
    a strain generating member pressing portion which is a projection provided on a lower face of the instep member so as to be opposed to the middle portion of the strain generating member and is connected to the strain generating member, wherein
    the strain generating member has rigidity that is set low under a condition that, when a maximum load supposed in advance is applied from the strain generating member pressing portion to the strain generating member, the middle portion of the strain generating member does not contact with the sole member.

6. The foot structure of a legged mobile robot according to claim 1, wherein:
the foot has a substantially rectangular shape in top plan view and has angular portions that form four corners, long sides extending along a forward and rearward direction, and short sides extending along a leftward and rightward direction,
the sole member has a strain generating member supporting base at each of the angular portions,
the strain generating members are each a leaf spring elongated in the forward and rearward direction and each extend between a pair of the strain generating member supporting bases on a left side on the sole member and between a pair of the strain generating member supporting bases on a right side on the sole member, and
the instep member has a strain generating member pressing portion which is a projection provided at each of opposite left and right end portions of a lower face of the instep member and which is connected to the middle portion of the strain generating member.

7. A legged mobile robot comprising:
a foot structure of a legged mobile robot, which is a structure of a foot provided at a lower end of a movable leg of the legged mobile robot, the foot structure including
an instep member connected to the movable leg,
a sole member which is disposed under the instep member and contacts with a walking surface,
a strain generating member which is connected to the instep member and the sole member at different positions from each other in top plan view and undergoes bending deformation according to a change in distance or inclination between the instep member and the sole member, and
a plurality of strain sensors disposed at positions different from each other on the strain generating member, wherein:
the strain generating member extends in a horizontal direction,
the strain generating member extends one-dimensionally, has a first position and a second position as connection positions to one of the instep member and the sole member, and has, between the first position and the second position, a third position as a connection position to the other of the instep member and the sole member,
the strain sensors are individually installed between the first position and the third position and between the second position and the third position, and
wherein at least one of:
(i) the first position and the second position are symmetrical positions with respect to the third position, and the strain sensors installed on opposite sides of the third position are installed at positions symmetrical with respect to the third position, and
(ii) the strain generating members are disposed on two sides, which are opposed to each other, of a rectangular shape that includes sides extending along a forward and rearward direction of the foot and sides extending in a leftward and rightward direction of the foot.

8. A foot structure of a legged mobile robot, which is a structure of a foot provided at a lower end of a movable leg of the legged mobile robot, the foot structure comprising:
an instep member connected to the movable leg;
a sole member which is disposed under the instep member and contacts with a walking surface;
a strain generating member which is connected to the instep member and the sole member at different positions from each other in top plan view and undergoes bending deformation according to a change in distance or inclination between the instep member and the sole member; and
a plurality of strain sensors disposed at positions different from each other on the strain generating member, wherein:
the strain generating member extends in a horizontal direction,
the strain generating member extends one-dimensionally, has a first position and a second position as connection positions to one of the instep member and the sole member, and has, between the first position and the second position, a third position as a connection position to the other of the instep member and the sole member,
the strain sensors are individually installed between the first position and the third position and between the second position and the third position,
the strain generating member is a leaf spring that elastically supports the instep member against a load of the legged mobile robot, and
the foot structure further comprising:
a strain generating member supporting base which is provided on the sole member and supports thereon opposite ends of the strain generating member such that a middle portion of the strain generating member is spaced away upwardly from the sole member; and
a strain generating member pressing portion which is a projection provided on a lower face of the instep member so as to be opposed to the middle portion of the strain generating member and is connected to the strain generating member, wherein
the strain generating member has rigidity that is set low under a condition that, when a maximum load supposed in advance is applied from the strain generating member pressing portion to the strain generating member, the middle portion of the strain generating member does not contact with the sole member.

9. A foot structure of a legged mobile robot, which is a structure of a foot provided at a lower end of a movable leg of the legged mobile robot, the foot structure comprising:
an instep member connected to the movable leg;
a sole member which is disposed under the instep member and contacts with a walking surface;
a strain generating member which is connected to the instep member and the sole member at different positions from each other in top plan view and undergoes bending deformation according to a change in distance or inclination between the instep member and the sole member; and
a plurality of strain sensors disposed at positions different from each other on the strain generating member, wherein:
the foot has a substantially rectangular shape in top plan view and has angular portions that form four corners, long sides extending along a forward and rearward direction, and short sides extending along a leftward and rightward direction,
the sole member has a strain generating member supporting base at each of the angular portions,
the strain generating members are each a leaf spring elongated in the forward and rearward direction and each extend between a pair of the strain generating member supporting bases on a left side on the sole member and between a pair of the strain generating member supporting bases on a right side on the sole member, and the instep member has a strain generating member pressing portion which is a projection provided at each of opposite left and right end portions of a lower face of the instep member and which is connected to the middle portion of the strain generating member.

* * * * *